United States Patent [19]
Chen et al.

[11] Patent Number: 5,785,247
[45] Date of Patent: Jul. 28, 1998

[54] IMPROVED GAS INJECTION NOZZLE FOR GAS ASSISTED INJECTION MOLDING

[75] Inventors: Yung-Chih Chen, I-Lan; Wen-Liang Liu; Long-Cheng Cheng, both of Hsinchu, all of Taiwan

[73] Assignee: Industrial Technology Research Institute, Hsinchu, Taiwan

[21] Appl. No.: 498,367

[22] Filed: Jul. 5, 1995

[51] Int. Cl.⁶ .................................................. B29C 45/23
[52] U.S. Cl. ........................... 239/135; 264/572; 425/130
[58] Field of Search .......................... 239/8, 13, 128, 239/135; 425/130, 549; 264/572; 141/82, 384

[56] References Cited

U.S. PATENT DOCUMENTS

| | | | |
|---|---|---|---|
| 5,164,200 | 11/1992 | Johnson | 425/130 |
| 5,174,932 | 12/1992 | Johnson et al. | 264/39 |
| 5,198,240 | 3/1993 | Baxi | 425/145 |
| 5,200,127 | 4/1993 | Nelson | 264/85 |
| 5,204,050 | 4/1993 | Loren | 264/572 |
| 5,208,046 | 5/1993 | Shah et al. | 425/130 |
| 5,256,047 | 10/1993 | Moldovanyi | 425/130 |
| 5,273,417 | 12/1993 | Nelson | 425/130 |
| 5,284,429 | 2/1994 | Schneider et al. | 425/130 |
| 5,295,800 | 3/1994 | Nelson | 425/130 |

*Primary Examiner*—Lesley D. Morris
*Attorney, Agent, or Firm*—W. Wayne Liauh

[57] ABSTRACT

An improved gas injection nozzle for use in gas-assisted injection molding process is disclosed. The improved gas injection nozzle comprises: (a) a nozzle body, and a nozzle cap fixedly connected to the nozzle body; (b) a gas inlet provided in the nozzle body so as to allow gas to be injected into a mold cavity via a gas channel formed inside both the nozzle body and the nozzle cap; (c) a heating coil provided on the gas injection nozzle; and (d) at least one circumferential groove formed on the outer surface of the nozzle cap. The circumferential groove formed on the outer surface of the nozzle cap preferably has the shape of a spiral groove, with a depth between about 0.2 mm and about 0.5 mm and a length between about 50 mm and about 150 mm. The combination of the heating coil and the circumferential groove prevents the formation of micro cracks that are often formed in the interstices between the nozzle cap and the sprue bushing during the cooling stage of injection molding process. These micro cracks allow passageways to be developed for the inert gas to be leaked out and a fall-off of the gas pressure inside the mold cavity, resulting in sinks and/or warpages to be formed on the injection molded product. The prevention of gas leakage also eliminates the need for continuous gas and thus reduces the manufacturing cost.

16 Claims, 4 Drawing Sheets

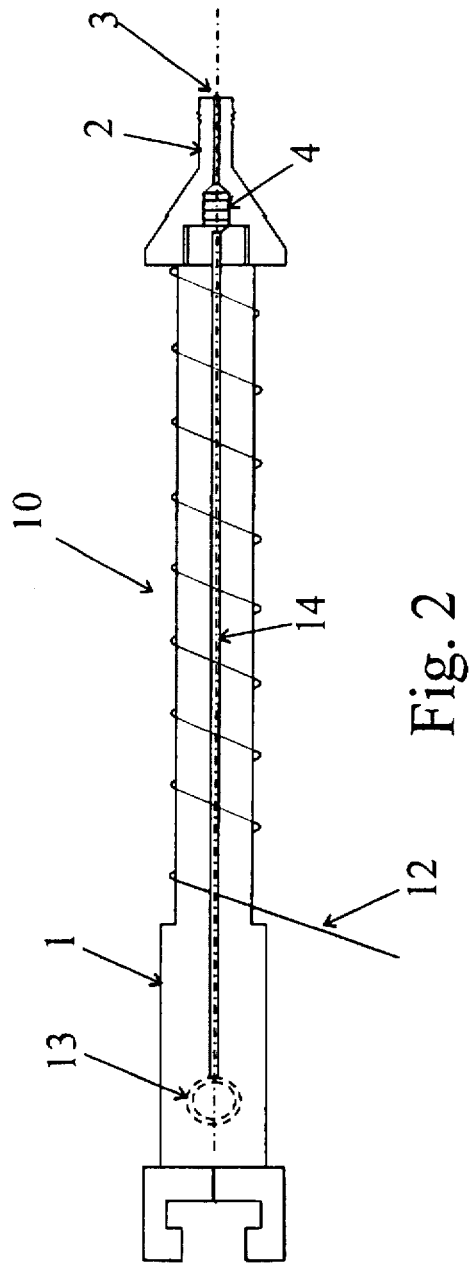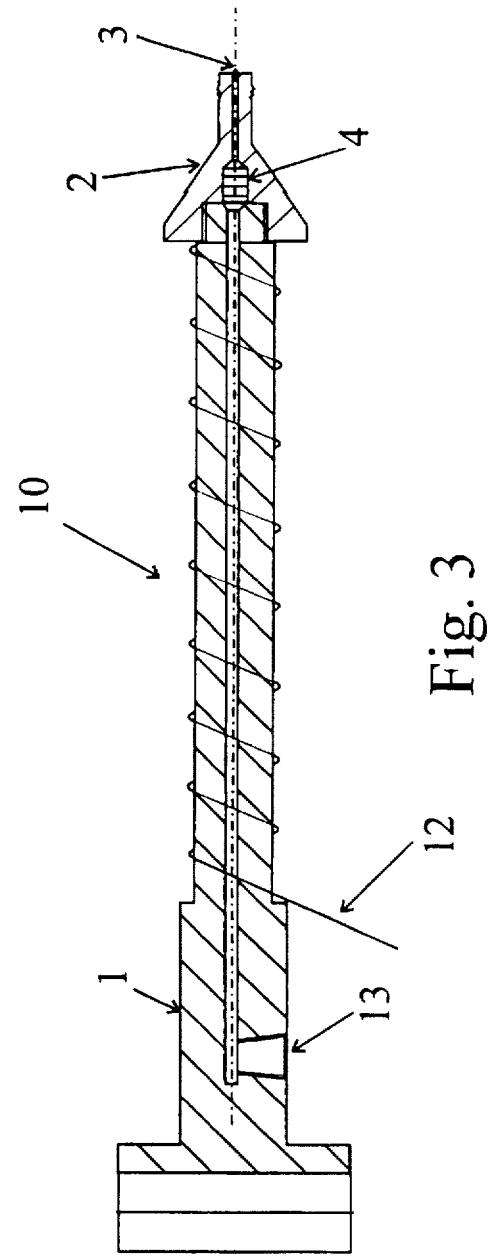

IMPROVED GAS INJECTION NOZZLE FOR GAS ASSISTED INJECTION MOLDING

FIELD OF THE INVENTION

The present invention relates to gas-assisted injection molding devices. More specifically, the present invention relates to an improved gas injection nozzle for use in gas-assisted injection molding which can minimize the extent of imperfections of the injection molded article. Alternatively, the present invention relates to an improved gas-assisted injection molding process which provides the benefits of enhanced quality control and reduced manufacturing cost.

BACKGROUND OF THE INVENTION

Gas-assisted injection molding has received great attention recently. In a conventional injecting molding process, articles are manufactured by injecting a molten plastic or resin material into a mold cavity, and letting the material cool to form a molded article. Then the mold cavity is opened and the article is released. It has been recognized that there were many restrictions in the conventional injection molding process, particularly in making a part with large, flat surfaces. Several methods and apparatuses have been developed in the prior art which are capable of generating pressure inside the molded component, so as to supplement the injection pressure exerted by the machine at the injection point and ameliorate some of the above mentioned shortcomings.

In a gas-assisted injection molding process to make plastic parts, the mold cavity is filled with a plasticized thermoplastic material, typically to a volume between 70% to 90% of the mold cavity, then an inert gas such as nitrogen is injected under pressure into the plasticized (molten) thermoplastic material to fill the rest of the volume in the mold cavity. In this process, the inert gas is injected into the center of the flow of the plasticized material but does not mix with the melt; instead, the injected gas flows along specially designed channels. The material displaced by the injected gas moves from the middle of the sections out to fill the remainder of the mold space.

A typical gas-assisted injection molding process involves an injection nozzle which enables a viscous molten polymer to selectively flow into a mold cavity and also enables the selective flow of a gas into the mold cavity. Gas assisted injection molding has provided solutions to a number problems encountered in the conventional injection molding processes. It has produced many beneficial results as reduction of stress and warpage of the plastic part, elimination of sink marks and the provision of smooth surfaces on the injection molded part. The gas assisted injection molding also reduces the need for external flow runners.

In U.S. Pat. Nos. 5,164,200 and 5,174,932, the contents of which are incorporated by reference, it is disclosed a nozzle for such gas assisted injection molding comprising an inlet end and a discharge end and a flow passage for viscous fluids extending from the inlet end to the discharge end. A valve element and a non-viscous fluid flow passage are provided which allows the flow of the viscous fluid into a mold cavity and flow of a non-viscous fluid into the mold cavity, and allows the venting of the non-viscous fluid out of the mold cavity.

In U.S. Pat. No. 5,198,240, the content of which is incorporated by reference, it is disclosed a pressurization control unit for use in a gas-assisted injection molding process, including a frame and a gas inflow conduit located on the frame. A gas storage device is secured to the frame and is in communication with a gas pressurization device. A gas outflow conduit is located on the frame with the gas outflow conduit being in fluid communication with the gas storage unit. A valve is provided in the gas outflow conduit for selectively allowing an outflow of the pressurized gas from the gas storage device. A control apparatus is located on the frame for controlling the operation of the gas pressurization device and the valve.

In U.S. Pat. No. 5,200,127, the content of which is incorporated by reference, it is disclosed a method and associated apparatus for gas assisted injection molding wherein a quantity of fluid molding material is injected through a first injection flow path in a molding nozzle into a mold cavity. The injection is then stopped, and a quantity of pressurized gas is injected into the mold cavity through a second injection flow path which is isolated from the first flow path. The pressure is reduced and held in the mold while the part cools enough to be self-supporting, at which time the pressure is vented from the mold cavity and the part removed. By isolating the molding material from the gas passages, clogging of the passages is achieved without the use of a check valve.

In U.S. Pat. No. 5,204,050, the content of which is incorporated by reference, it is disclosed an improved gas assisted injection molding process and apparatus, by which hot resin is injected into a mold, gas is injected into the resin to fill out the mold cavity, the resin cools, the gas is vented, and the mold is opened to remove the molded part. The gas is injected into the resin at first and second locations. The pressure at which the gas is injected into the resin at the first and second locations is separately regulated. This allows a relatively low pressure gas to be initially injected into the resin at the first location and a relatively high pressure gas to be injected into the resin at the second location to optimize the packing out of the resin in the mold cavity.

In U.S. Pat. No. 5,208,046, the content of which is incorporated by reference, it is disclosed a nozzle for injection molding of thermoplastic viscous fluid materials which includes a nozzle body having a bore to provide a flow path. One end of the nozzle body (discharge end) is adapted for viscous fluid connection with a sprue of an associated mold body, and the other end (inlet end) is adapted for viscous fluid connection with an end of an associated injection machine. A reciprocating valve means is provided for reciprocating the nozzle body flow passage to control the flow of the viscous fluid through the nozzle body discharge end. The nozzle also contains an actuator means for selectively actuating the valve means to an open or closed position. The reciprocating valve means has a bore located longitudinally within the reciprocating valve means to provide a flow passage for non-viscous fluid and has a pin means located within the flow passage providing an orifice at the flow passage discharge end.

In U.S. Pat. No. 5,256,047, the content of which is incorporated by reference, it is disclosed an apparatus for use in fluid assisted injection molding of plastic material so as to form an injection molded product. The apparatus comprises a pair of mold members defining when closed a sealed cavity. A first opening is provided in one of the mold members for allowing the injection of the plastic material into the cavity. A second opening is provided in one of the mold members, and spaced from the first opening, for allowing the injection of the fluid into the cavity. A sleeve, which extends through the second opening, has a longitudinally extending bore with an open first end. A first means is provided for rigidly securing the sleeve in relation to the one of the mold members. A pin extends through the sleeve. A second means is provided for rigidly securing the pin in relation to the sleeve. The injection molding apparatus can be used for in-article and in-runner fluid injection as well as sprue bushing type fluid injection which would overcome the problem of plugging of the gas channels with thermoplastic materials during the venting of the gas.

In U.S. Pat. No. 5,273,417, the content of which is incorporated by reference, it is disclosed an improved nozzle for gas-assisted injection molding. The improved nozzle employs a very simple design to vent the gas from the mold cavity once the plastic article has cooled sufficiently to be self supporting. A separate plastic shut-off valve, a gas inlet passage with a check valve, and a separate gas venting passing containing a movable pin are provided. Venting of the pressurized gas occurs by the movement of the movable pin so that the pressurized gas can burst through the thin layer of the plastic material covering the gas venting passage. This design allows for almost continuous operation of the injection molding with minimal operator attention to the nozzle.

In U.S. Pat. No. 5,284,429, the content of which is incorporated by reference, it is disclosed a gas-assisted injection molding apparatus comprising a cavity defining the shape of the thermoplastic article to be molded, a thermoplastic entry aperture which is adapted to receive molten thermoplastic resin from a nozzle, a thermoplastic flow path in fluid communication with the thermoplastic entry aperture and with the cavity, and a gas flow passageway extending from the exterior surface of the mold to the thermoplastic flow path. The end portion of the gas flow passageway has a plug disposed therein which comprises a porous core. The porous core permits the flow of gas therethrough but prevents the passage of the molten thermoplastic resin therethrough.

In U.S. Pat. No. 5,295,800, the content of which is incorporated by reference, it is disclosed an apparatus for use in gas assisted injection molding which first injects a shot of molten plastic resin into a mold, shuts off the plastic flow into the mold, and either immediately, or after a delayed time, injects a pressurized gas into the mold. The pressure of the gas in the mold is then controlled by stepping up or stepping down the pressure in the mold in a series to arrive at a second predetermined pressure, which is held for a desired time. The setting and holding of the pressure is repeated several times and then is stepped down to a final pressure. By precisely controlling the pressure of the injected gas, molding stress and warpage as well as sink marks will be reduced or eliminated.

One of the problems associated with the prior art devices that have been discovered by the co-inventors of the present invention is that, during the cooling stage, the thermoplastic material contained in the sprue bushing or the runner would shrink, causing micro cracks to be formed. This could lead to gas leakages to occur through the interstices between the nozzle gap and the inner wall of the spruce or the runner. When this happens, the injected gas inside the mold cavity will gradually lose its pressure, thus causing defects in the molded products, such as sink marks, depressions, warpages, or other imperfections.

With the increased maturing of the gas assisted injection molding technology, the range of its commercial applications has widened and the expectation for defect-free products has also substantially increased. To ensure the obtainment of the best possible and defect-free quality of the injection molded products, it is, therefore, important that the gas leakage be reduced to a minimum-20 or much more preferably, it be sealed completely. By sealing off this gas leakage, it can therefore be ensured that a proper pressure is maintained in the mold cavity during the cooling stage of the injection molding process and thus the integrity of the final molded parts. On the other hand, sealing off the gas leakage eliminates the need for constantly supplying the filling gas, thus reducing the manufacturing cost.

SUMMARY OF THE INVENTION

The primary object of the present invention is to develop an improved gas injection nozzle for use in gas-assisted injection molding process which can minimize or eliminate the gas leakage and help maintaining the gas pressure inside the mold cavity during the cooling stage. More specifically, the primary object of the present invention is to develop an improved gas injection nozzle for use in gas-assisted injection molding process which avoids the formation of micro cracks so as to seal off possible gas leakages and maintain the gas pressure inside the mold cavity at the desired level, as as to obtain quality product and reduce manufacturing cost.

In a gas-assisted injection molding process, a quantity of fluid molding material is injected through a first injection flow path in a molding nozzle into a mold cavity. The injection is then stopped, and a quantity of pressurized gas is injected into the mold cavity through a second injection flow path which is typically isolated from the first flow path. The pressure is then held in the mold cavity while the part cools enough to be self-supporting, at which time the pressure is vented from the mold cavity and the part removed. In the improved gas injection nozzle disclosed in the present invention, one or more circumferential grooves are provided on the outer surface of the nozzle cap of the injection nozzle. A heating device, such as heating coil or a heating plate, is also provided with the nozzle. The combination of the heating device and the enhanced contact area between the nozzle cap and the thermoplastic resin as a result of the circumferential grooves allows the thermoplastic resin to be maintained at a desired temperature during the cooling stage. Preferably, the circumferential groove is a spiral groove gyrating about the nozzle cap. However, the circumferential groove or grooves can comprise one or more circular grooves, or of any other shape or size.

Without the improvement disclosed in the present invention micro cracks often can be formed in the interstices during the cooling stage of the thermoplastic resin. These micro cracks allow passageways to be developed for the inert gas that has been injected to leak out and a fall-off of the gas pressure inside the mold cavity. The decrease in the gas pressure can result in defects or imperfections in the molded parts. For relatively thick-walled parts, inadequate cavity pressure could cause sinks to be formed on the surface thereof For relatively thin-walled parts, the consequence of inadequately maintained cavity pressure often can be warped products. Therefore, the present invention provides the benefits of not only avoiding the shortcomings experienced in using the prior art devices, it also reduces the manufacturing cost by providing a more efficient and cost-effective process, which reduces the amount of the inert gas required in the gas-assisted injection process and improves quality control by reducing the rate of product rejects.

BRIEF DESCRIPTION OF THE DRAWING

The present invention will be described in detail with reference to the drawings showing the preferred embodiment of the present invention, wherein:

FIG. 2 is a side view of a preferred embodiment of an improved gas injection nozzle of the present invention.

FIG. 3 is a side view of the preferred embodiment of improved gas injection nozzle of the present invention as shown in FIG. 2, but is rotated 90 degrees about the axis.

DETAILED DESCRIPTION OF THE PREFERRED EMBODIMENT

Figure 1:
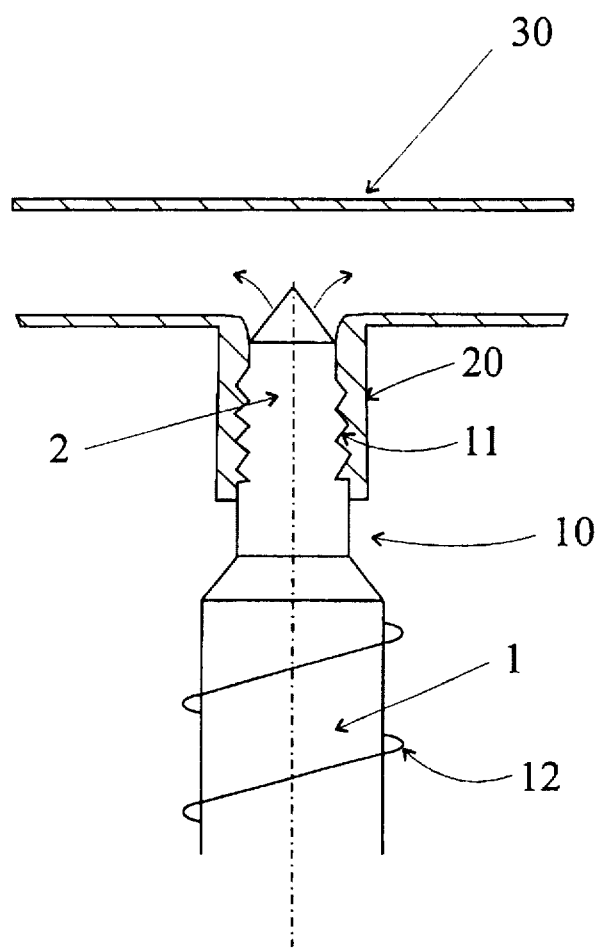
FIG. 1 is a schematic axial cross-sectional drawing of a preferred embodiment of the present invention showing the front portion of a gas injection nozzle that has been inserted into the sprue bushing of a mold cavity; the gas injection nozzle is provided with a spirally shaped circumferential groove on the external surface of the nozzle cap thereof.

The present invention discloses an improved gas injection nozzle for use in a gas-assisted injection molding process which can help maintain the gas pressure inside the mold cavity during the cooling stage, so as to avoid the formation of sinks or warps in the injection molded products. In a gas assisted injection molding process, a quantity of fluid molding material is injected through a first injection flow path, typically a sprue bushing or a runner connected to the mold cavity, via an injection molding nozzle into a mold cavity. After about 70% to 90% of the intended volume is injected, the injection is then stopped, and a quantity of pressurized gas is injected into the mold cavity through a second injection flow path, typically via a nozzle pin provided within a nozzle cap; the second injection is isolated from the first flow path. The pressure is then held at a desired level in the mold while the part is cooled to obtain enough rigidity so as to be self-supporting, at which time the pressure is vented from the mold cavity and the part removed. Typically, the injection nozzle contains a nozzle body and a nozzle cap, which is inserted through the sprue or runner connected to the mold cavity.

In the improved gas injection nozzle disclosed in the present invention, one or more circumferential grooves are provided on the outer surface of the nozzle cap of the injection nozzle. Additionally, a heating device, such as a heating coil or a heating plate, is also provided with the nozzle. The combination of the heating device and the enhanced contact area between the nozzle cap and the thermoplastic resin as a result of the circumferential grooves, allows the nozzle cap and the nozzle pin to be maintained at a desired temperature, typically between 60° and 100° C., during the cooling stage.

The circumferential grooves increase the path through which the escaping gas, if any, must travel. This will effectively slow down the pressure fall-off process if this does occur. Furthermore, the substantially increased volume of the thermoplastic resin in the interstices as a result of the presence of the grooves (which in effect provides a large storage space for the thermoplastic resin, relative to the volume of the interstice without the groove), also eliminates or substantially minimizes the occurrence or the size of micro cracks. Without the improvement disclosed in the present invention, micro cracks often can be formed in the interstices between the nozzle cap and the inner wall of the sprue or the runner during the cooling stage of the thermoplastic resin. These micro cracks allow escape passageways to be developed for the inert gas that has been injected into the mold cavity to leak out and a fall-off of the gas pressure inside the mold cavity will occur, thus a failure to maintain the desired pressure. The decrease in the gas pressure often can result in defects or imperfections in the molded parts. For relatively thick-walled parts, inadequate cavity pressure could cause sinks to be formed on the surface thereof. For relatively thin-walled parts, the consequence of inadequately maintained cavity pressure often are warped products.

Now referring to FIG. 1, which is a schematic axial cross-sectional drawing of a preferred embodiment of the present invention showing the front portion of a gas injection nozzle 10 that has been inserted into the sprue bushing 20 connected to a mold cavity 30. FIG. 1 describes, in a nutshell, the principle of the improved gas injection nozzle developed in the present invention in which a spiral groove 11 was provided on the external surface of the nozzle cap 2 of the gas injection nozzle 10. A heating coil 12 is also provided which spirally wraps about the outer surface of the nozzle body 1. As discussed above, the groove or grooves increase the path through which the escaping gas must travel. This will effectively reduce the rate of the pressure fall-off in the mold cavity if this does occur. Furthermore, the substantially increased volume of the thermoplastic resin in the interstices (relative to the volume of the interstice without the groove) as a result of the presence of the grooves provides an effective reserve space for storing the thermoplastic resin, it also eliminates or substantially minimizes the size of micro cracks.

Figure 4:
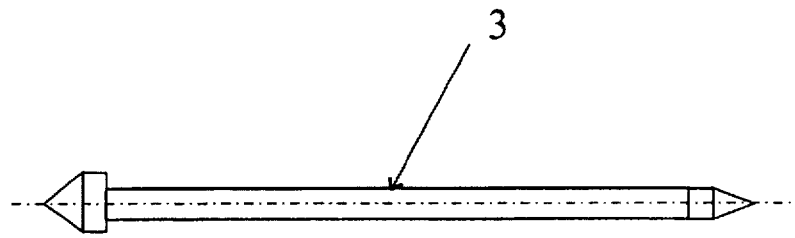
FIG. 4 is a schematic axial cross-sectional view of the nozzle pin of the gas injection nozzle as shown in FIG. 2.
Figure 5:
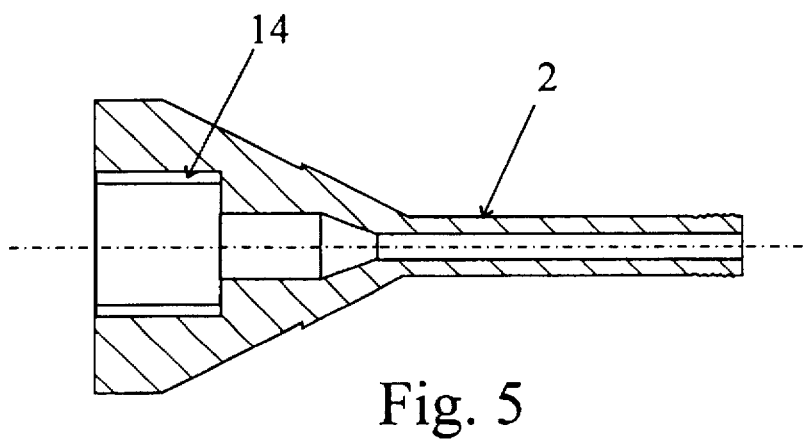
FIG. 5 is a schematic axial cross-sectional view of the nozzle cap of the gas injection nozzle as shown in FIG. 2.
Figure 6:
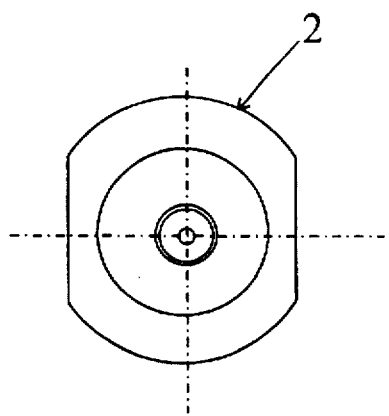
FIG. 6 is a schematic top view of the nozzle cap of the gas injection nozzle as shown in FIG. 2.

FIG. 2 is a side view of a preferred embodiment of an improved gas injection nozzle 10 disclosed in the present invention. FIG. 3 is a side view, of the same gas injection nozzle as shown in FIG. 2, except that it was axially rotated 90 degrees. The improved gas injection nozzle 10 disclosed in the present invention contains a nozzle body 1, a nozzle cap 2 provided in the front portion of the nozzle 10, a nozzle pin 3 provided inside the nozzle cap 2, and a spring 4. Gas is injected through the nozzle gas inlet 13. It then travels through the internal gas channel 14 and the nozzle pin 3, before it enters a mold cavity. FIG. 4 is a schematic axial cross-sectional view of the nozzle pin 3 of the gas injection nozzle as shown in FIG. 2. FIG. 5 is a schematic axial cross-sectional view of the nozzle cap 2 of the gas injection nozzle as shown in FIG. 2. FIG. 6 is a schematic top view of the same nozzle cap 2 as shown in FIG. 5.

The present invention will now be described more specifically with reference to the following example. It is to be noted that the following descriptions of examples, including the preferred embodiment of this invention, are presented herein for purposes of illustration and description, and are not intended to be exhaustive or to limit the invention to the precise form disclosed.

A gas injection nozzle 10 as substantially shown in FIGS. 2–6 was obtained. The gas injection nozzle 10 contains a spirally shaped circumferential groove 11 having a depth of about 0.2 mm to 0.5 mm and a total length of about 50 mm to 150 mm formed on the outer surface of the nozzle cap 2 of the gas injection nozzle 10. The nozzle body 1 of the gas injection nozzle 10 was wrapped with a heating coil 12.

Figure 7:
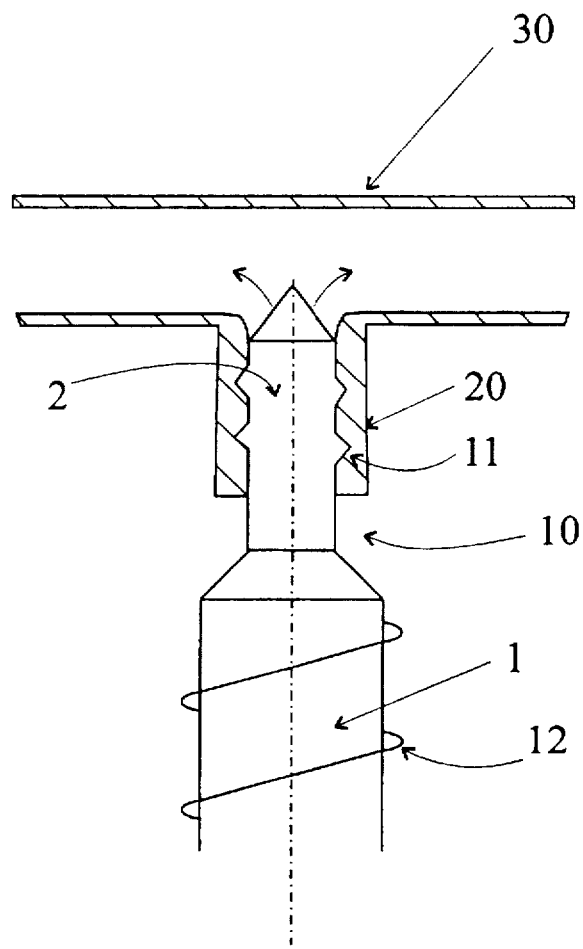
FIG. 7 is a schematic axial cross-sectional drawing of another preferred embodiment of the present invention in which the circumferential groove is a circular groove.

Molten thermoplastic resin was injected into a mold cavity 30 via a sprue bushing 20, as shown in FIG. 1. After about 70% to 90% of the designed volume of the thermoplastic resin was injected into the mold cavity 30, the gas injection nozzle 10 as shown in FIGS. 1–6 was inserted into the sprue bushing 20. An inert gas, such as nitrogen, was injected through the nozzle gas inlet 13, gas channel 14 and nozzle pin 3 into the mold cavity 30. The injected inert gas pushed the molten thermoplastic resin into lower pressure, higher temperature, or lower viscosity regions. After the completion of the injection, the mold cavity began to cool off, and the heating coil 12 that was wrapped on the external surface of the nozzle cap 1 was turned on. The heating coil 12 allowed the nozzle cap and the nozzle pin to be maintained at a temperature between 60° and 100° C., during the cooling stage. The circumferential groove 11 and the heating coil 12 have successfully prevented any leakage to be detected. The final product, which was an arcuate front plate of a file drawer with a dimension of 100 mm×320 mm, was found to be free of any sink marks or warpage. Because the present invention completely eliminates gas escapage during the holding period, substantial cost savings can be realized in the manufacturing of thermoplastic parts using the gas-assisted injection molding process, in addition to the excellent products that are results of the improved design of the present invention. While FIG. 1 shows a spirally-shaped circumferential groove, FIG. 7 is a schematic axial cross-sectional drawing of another preferred embodiment of the present invention in which the circumferential groove is a circular groove.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An improved gas injection nozzle for use in gas-assisted injection molding process comprising:
   (a) a nozzle body, and a nozzle cap fixedly connected to said nozzle body;
   (b) a gas inlet provided in said nozzle body for allowing a gas to be injected into a mold cavity via a gas channel formed inside both said nozzle body and said nozzle cap;
   (c) heating means provided on said gas injection nozzle; and
   (d) at least one circumferential groove formed on an outer surface of said nozzle cap.

2. The improved gas injection nozzle for use in gas-assisted injection molding process according to claim 1 wherein said at least one circumferential groove formed on the outer surface of said nozzle cap has a depth between about 0.2 mm and about 0.5 mm.

3. The improved gas injection nozzle for use in gas-assisted injection molding process according to claim 1 wherein said at least one circumferential groove formed on the outer surface of said nozzle cap has a length between about 50 mm and about 150 mm.

4. The improved gas injection nozzle for use in gas-assisted injection molding process according to claim 1 wherein said at least one circumferential groove formed on the outer surface of said nozzle cap has a depth between about 0.2 mm and about 0.2 mm and a length between about 50 mm and about 150 mm.

5. The improved gas injection nozzle for use in gas-assisted injection molding process according to claim 1 wherein said at least one circumferential groove is a spiral groove.

6. The improved gas injection nozzle for use in gas-assisted injection molding process according to claim 1 wherein said at least one circumferential groove is a circular groove.

7. The improved gas injection nozzle for use in gas-assisted injection molding process according to claim 1 wherein said heating means comprises a heating coil wrapped about said nozzle body.

8. The improved gas injection nozzle for use in gas-assisted injection molding process according to claim 1 wherein said at least one circumferential groove and said heating means are provided such that a temperature of about 60° to about 100° C. can be maintained at said nozzle cap during a cooling stage of said gas-assisted injection molding process.

9. An improved gas-assisted injection molding process comprising the steps of:
   (a) injecting a plasticized thermoplastic resin into a mold cavity via a sprue bushing means connected to said mold cavity and in fluid communication therewith;
   (b) after injecting about 70% to about 90% of an intended amount of said plasticized thermoplastic resin to be eventually injected into said mold cavity, inserting a gas injection nozzle into said sprue bushing means, wherein said gas injection nozzle comprising:
      (i) a nozzle body with a nozzle cap fixedly connected thereto;
      (ii) a gas inlet provided in said nozzle body so as to allow gas to be injected into a mold cavity via a gas channel formed inside both said nozzle body and said nozzle cap;
      (iii) heating means provided on said gas injection nozzle; and
      (iv) at least one circumferential groove formed on an outer surface of said nozzle cap;
   (c) injecting an inert gas into said mold cavity;
   (d) after said intended amount of said plasticized thermoplastic resin is injected, beginning a cooling step to cool said plasticized thermoplastic resin inside said mold cavity;
   (e) turning said heating means on wherein said at least one circumferential groove and said heating means minimizes a shrinkage of said plasticized thermoplastic resin contained in interstices between said nozzle cap and an internal wall of said sprue bushing means so as to prevent a leakage of said inert gas therethrough; and
   (f) removing a hardened article made from said thermoplastic resin from said mold cavity.

10. The improved gas-assisted injection molding process according to claim 9 wherein said at least one circumferential groove formed on the outer surface of said nozzle cap has a depth between about 0.2 mm and about 0.5 mm.

11. The improved gas-assisted injection molding process according to claim 9 wherein said at least one circumferential groove formed on the outer surface of said nozzle cap has a length between about 50 mm and about 150 mm.

12. The improved gas-assisted injection molding process according to claim 9 wherein said at least one circumferential groove formed on the outer surface of said nozzle cap has a depth between about 0.2 mm and about 0.5 mm and a length between about 50 mm and about 150 mm.

13. The improved gas-assisted injection molding process according to claim 9 wherein said at least one circumferential groove is a spiral groove.

14. The improved gas-assisted injection molding process according to claim 9 wherein said at least one circumferential groove is a circular groove.

15. The improved gas-assisted injection molding process according to claim 9 wherein said heating means comprises a heating coil wrapped about said nozzle body.

16. The improved gas-assisted injection molding process according to claim 9 wherein said at least one circumferential groove and said heating means are provided such that a temperature of about 60° to about 100° C. is maintained at said nozzle cap during said cooling stage.

* * * * *